3,014,937
4,9-DIHALO ANDROSTENE COMPOUNDS
Howard J. Ringold and Fred A. Kincl, Mexico City, Mexico, assignors to Syntex S.A., Mexico City, Mexico, a corporation of Mexico
No Drawing. Filed Dec. 29, 1958, Ser. No. 783,088
Claims priority, application Mexico Jan. 13, 1958
9 Claims. (Cl. 260—397.45)

The present invention relates to cyclopentanophenanthrene derivatives.

More particularly the present invention relates to novel 17α - lower alkyl-4,9-dihalo-Δ⁴-androsten - 17β-ol-3-one compounds having an 11-keto group or an 11β-hydroxy group and wherein the 4-halo group is chlorine or bromine and the 9-halo group is chlorine, bromine or fluorine. These novel 17α-lower alkyl compounds and especially the 17-methyl derivatives are hormones of the androgenic type having an especially marked anabolic effect.

The novel compounds of the present invention are illustrated in general by the following formula:

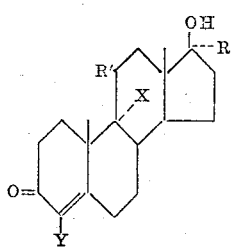

wherein R is =O or $$\overset{OH}{\underset{H}{|}}$$

R is lower alkyl such as methyl, ethyl or propyl and most desirably methyl, X is bromo, chloro or fluoro and Y is chloro or bromo.

The novel compounds are prepared by a process illustrated by the following equation:

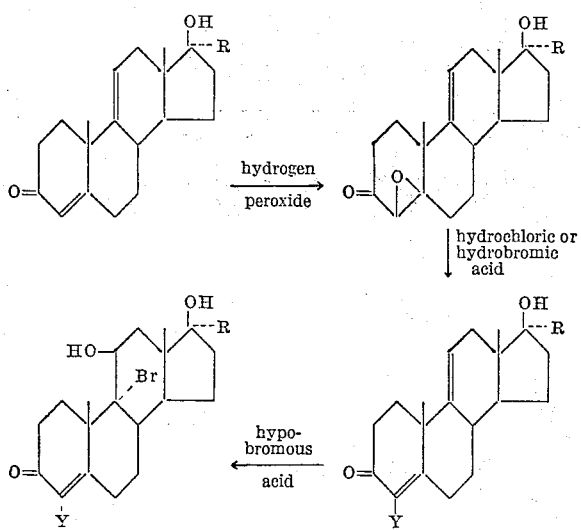

In the above equation X, R and Y represent the same groups as heretofore and X¹ represents chloro or bromo. 17α-methyl-Δ⁴,⁹⁽¹¹⁾-androstadien - 17β-ol-3-one (Herr et al., J. Am. Chem. Soc., 78, 500 (1956)) was treated with concentrated hydrogen peroxide, preferably in methanol solution in the presence of aqueous sodium hydroxide solution, and thus there was obtained 17α-methyl - 4β,5β-oxide-Δ⁹⁽¹¹⁾-androsten - 17β-ol-3-one. By reaction of the latter with concentrated hydrochloric or hydrobromic acid, for example in acetone solution, there was produced the corresponding 17α-methyl - 4 - halo-Δ⁴,⁹⁽¹¹⁾-androstadien-17β-ol-3-one which in turn was allowed to react with hypobromous acid to produce the respective 17α-methyl-4-halo - 9α - bromo-Δ⁴-androsten-11β,17β-diol-3-one; preferably this reaction was effected by treatment of the steroid in dioxane solution with N-bromoacetamide and perchloric acid.

In order to substitute the bromine atom at C–9α with chlorine or fluorine, there was prepared 17α-methyl-4-halo-9β,11β-oxido-Δ⁴-androsten-17β-ol-3-one by reaction of the 4-halo-9α-bromo-Δ⁴-androsten-11β,17β-diol-3-one with potassium acetate, for example in methanol solution. The epoxide ring was then opened by reaction with concentrated hydrochloric or hydrofluoric acid; preferably by stirring a solution of the 9β,11β-oxido compound in methylene dichloride with aqueous concentrated solutions of such acids. There was thus obtained the corresponding halohydrins.

By oxidation of the 11β-hydroxyl groups as indicated in the equation there was obtained the corresponding 17α-methyl-4,9α-dihalo - 11 - keto-testosterones. This oxidation was carried out by conventional methods, preferably by reaction with chromic acid in aqueous acetic acid solution.

The following specific examples serve to illustrate but are not intended to limit the present invention.

*Example I*

To a solution of 10 g. of 17α-methyl-Δ⁴,⁹⁽¹¹⁾-androstadien-17β-ol-3-one in 300 cc. of methanol there was added 60 cc. of concentrated hydrogen peroxide solution followed by 20 cc. of cold 10% sodium hydroxide solution, which were added slowly under stirring and maintaining the temperature of the mixture below 20° C. After standing for 48 hours, the mixture was poured into water and extracted with methylene dichloride. The extract was washed with water to neutral, dried over anhydrous sodium sulfate, filtered and evaporated to dryness. Crystallization of the residue from acetone afforded 17α-methyl-4β,5β-oxido-Δ$^{9(11)}$-androsten-17β-ol-3-one.

A solution of 8 g. of the above compound in 80 cc. of acetone was treated with 8 cc. of concentrated hydrochloric acid, slowly and under stirring, and the mixture was kept at room temperature for 1 hour. It was then diluted with ice water until it became turbid and kept overnight in the refrigerator. The precipitate formed was collected, thus giving 17α-methyl-4-chloro-Δ$^{4,9(11)}$-androstadien-17β-ol-3-one.

To a solution of 5 g. of the above compound in 250 cc. of dioxane containing 45 cc. of water there was added under continuous stirring 750 mg. of N-bromoacetamide and then 45 cc. of 0.8 N perchloric acid, in the course of 5 minutes. The mixture was stirred for 10 minutes longer, poured into 500 cc. of 10% sodium bisulfite solution and then ice and sodium chloride were added. The precipitate was collected, washed with water and dried. There was thus obtained the crude 17α-methyl-4-chloro-9α-bromo-Δ$^4$-androsten-11β,17β-diol-3-one. The pure substance was obtained by recrystallization from acetone.

A stirred solution of 5 g. of the above compound in 250 cc. of 90% acetic acid was slowly treated at room temperature with a solution of 1.2 equivalents of chromium trioxide in 25 cc. of 80% acetic acid. The mixture was kept at room temperature for 1 hour and then diluted with water to precipitate the 17α-methyl-4-chloro-9α-bromo-Δ$^4$-androsten-17β-ol-3,11-dione formed, which was collected by filtration, washed with water and purified by recrystallization from methanol.

*Example II*

In another experiment, in accordance with the method of Example I, the reaction of 17α-methyl-4β,5β-oxido-Δ$^{9(11)}$-androsten-17β-ol-3-one was carried out with concentrated hydrobromic acid instead of hydrochloric acid, thus giving rise to the formation of 17α-methyl-4-bromo-Δ$^{4,9(11)}$-androstadien-17β-ol-3-one. There were then obtained 17α-methyl-4,9α-dibromo-Δ$^4$-androsten-11β,17β-diol-3-one and 17α-methyl-4,9α-dibromo-Δ$^4$-androsten-17β-ol-3,11-dione.

*Example III*

A mixture of 2 g. of 17α-methyl-4-chloro-9α-bromo-Δ$^4$-androsten-11β,17β-diol-3-one, 80 cc. of methanol and 2 g. of anhydrous potassium acetate was kept at room temperature for 24 hours and then, under stirring, diluted with water until complete precipitation. The 17α-methyl-4-chloro-9β,11β-oxido-Δ$^4$-androsten-17β-ol-3-one formed was collected by filtration, washed with water and dried. The pure substance was obtained by recrystallization from acetone.

The above crude compound was dissolved in 80 cc. of methylene dichloride in a polyethylene container and cooled to 0° C. The solution was then treated with 8 cc. of 50% aqueous hydrofluoric acid, which was added slowly, with vigorous stirring and maintaining the temperature at around 0° C. The stirring was continued at a temperature around 0° C. for 6 hours and then water was added. The organic layer was separated, washed with water to neutral and concentrated to a small volume. The residue was treated with hexane and cooled, thus producing the crystalline 17α-methyl-4-chloro-9α-fluoro-Δ$^4$-androsten-11β,17β-diol-3-one, which was filtered, washed and dried.

By the same method described in Example I, there was oxidized the 11β-hydroxyl group of this compound to the keto group, thus yielding 17α-methyl-4-chloro-9α-fluoro-Δ$^4$-androsten-17β-ol-3,11-dione.

*Example IV*

By the method of the previous example, 17α-methyl-4-bromo-9β,11β-oxido-Δ$^4$-androsten-17β-ol-3-one was converted into 17α-methyl-4-bromo-9α-fluoro-Δ$^4$-androsten-11β,17β-diol-3-one, which was then converted into 17α-methyl-4-bromo-9α-fluoro-Δ$^4$-androsten-17β-ol-3,11-dione.

*Example V*

By substituting in the method of Examples III and IV the concentrated hydrofluoric acid by concentrated hydrochloric acid, there were obtained: 17α-methyl-4,9α-dichloro-Δ$^4$-androsten-11β,17β-diol-3-one, 17α-methyl-4,9α-dichloro-Δ$^4$-androsten-17β-ol-3,11-dione, 17α-methyl-4-bromo-9α-chloro-Δ$^4$-androsten-11β,17β-diol-3-one and 17α-methyl-4-bromo-9α-chloro-Δ$^4$-androsten-17β-ol-3,11-dione, respectively.

We claim:
1. 17α-methyl-4,9α-dibromo-Δ$^4$-androsten-11β,17β-diol-3-one.
2. 17α-methyl-4-bromo-9α-chloro-Δ$^4$-androsten-11β,17β-diol-3-one.
3. 17α-methyl-4-bromo-9α-fluoro-Δ$^4$-androsten-11β,17β-diol-3-one.
4. 17α-methyl-4,9α-dichloro-Δ$^4$-androsten-17β-ol-3,11-dione.
5. 17α-methyl-4-chloro-9α-bromo-Δ$^4$-androsten-17β-ol-3,11-dione.
6. 17α-methyl-4-chloro-9α-fluoro-Δ$^4$-androsten-17β-ol-3,11-dione.
7. 17α-methyl-4,9α-dibromo-Δ$^4$-androsten-17β-ol-3,11-dione.
8. 17α-methyl-4-bromo-9α-chloro-Δ$^4$-androsten-17β-ol-3,11-dione.
9. 17α-methyl-4-bromo-9α-fluoro-Δ$^4$-androsten-17β-ol-3,11-dione.

References Cited in the file of this patent

UNITED STATES PATENTS

| | | |
|---|---|---|
| 2,735,854 | Herr | Feb. 21, 1956 |
| 2,793,218 | Herr | May 21, 1957 |

OTHER REFERENCES

"JACS," vol. 78, page 3541, article of Camerino et al.